(12) United States Patent
Klingbeil et al.

(10) Patent No.: US 12,315,077 B2
(45) Date of Patent: May 27, 2025

(54) DECENTRALIZED DIGITALIZATION OF PHYSICAL OBJECTS

(71) Applicant: SAP SE, Walldorf (DE)

(72) Inventors: Thomas Klingbeil, Potsdam (DE); Sebastian Kliem, Potsdam (DE); Wanja Pasternak, Falkensee (DE)

(73) Assignee: SAP SE, Walldorf (DE)

( * ) Notice: Subject to any disclaimer, the term of this patent is extended or adjusted under 35 U.S.C. 154(b) by 249 days.

(21) Appl. No.: 18/057,593

(22) Filed: Nov. 21, 2022

(65) Prior Publication Data

US 2024/0169665 A1 May 23, 2024

(51) Int. Cl.
*G06T 17/00* (2006.01)
*G06T 1/60* (2006.01)

(52) U.S. Cl.
CPC ............ *G06T 17/00* (2013.01); *G06T 1/60* (2013.01); *G06T 2210/32* (2013.01); *G06T 2210/61* (2013.01)

(58) Field of Classification Search
CPC ......... G06T 17/00; G06T 11/00; G06T 15/00; G06T 7/50; G06T 19/003; G06T 19/00; G06T 2200/04; G06T 2200/08; G06T 2200/21; G06T 2210/61; G06T 2210/32; G06T 7/557; G06T 15/205; G06T 5/50; G06T 2207/10028; G09G 2340/12
See application file for complete search history.

(56) References Cited

U.S. PATENT DOCUMENTS

2022/0132095 A1* 4/2022 Leung ................. H04N 13/178
2022/0237336 A1* 7/2022 Zhao .................... G06N 3/08
2022/0270297 A1* 8/2022 Koh ..................... G06N 3/08

OTHER PUBLICATIONS

Heges 3D Scanner, https://hege.sh/, Retrieved Sep. 28, 2022, 2 pages.
Apple Developer Object Capture—Augmented Reality, https://developer.apple.com/augmented-reality/object-capture/, Retrieved Sep. 28, 2022, 3 pages.
O'Neal, Bridget, "FreeLSS Open Source 3D Printable Scanning System Powers DIY Scanners Like the ATLAS 3D", https://3dprint.com/36628/freelss-open-source-scanner/, Jan. 15, 2015, 5 pages.

* cited by examiner

*Primary Examiner* — Hau H Nguyen
(74) *Attorney, Agent, or Firm* — Fountainhead Law Group, PC

(57) ABSTRACT

Embodiments implement decentralized digitalization of physical objects. A digitalization engine in the cloud, receives two dimensional (2D) image data of a physical object (e.g., pizza slice) located at a first remote location (e.g., restaurant). A local scanning rig in conjunction with an image capture device (e.g., mobile phone), creates an image file comprising the 2D image, depth information, and an identifier. The digitalization engine receives the 2D image file, stores it, and forwards the 2D image file to an image processing resource also remote from the digitalization engine. The digitalization engine then receives from the image processing resource, a three dimensional model file (e.g., created by photogrammetry) of the 2D images. The digitalization engine communicates the 3D model file for consumption (e.g., incorporation of the 3D pizza slice into a virtual menu). By distributing image processing resources across multiple image consumers, embodiments avoid one consumer having to shoulder digitalization costs.

19 Claims, 5 Drawing Sheets

DECENTRALIZED DIGITALIZATION OF PHYSICAL OBJECTS

BACKGROUND

Unless otherwise indicated herein, the approaches described in this section are not prior art to the claims in this application and are not admitted to be prior art by inclusion in this section.

With the emerging importance of digital content being displayed on screens in the context of Virtual Reality (VR), Augmented Reality (AR), and the Metaverse, it may be desirable to represent physical objects in those virtual realities. Such physical objects that are to be represented, can include but are not limited to, food, beverages, tableware and other everyday items.

One approach to digitizing objects, is photogrammetry. In this technique, a large number of images of the physical object are taken from multiple perspectives. Those images are then merged into a 3D model by a software application.

SUMMARY

Embodiments relate to systems and methods implementing decentralized digitalization of physical objects. A digitalization engine in the cloud, receives two dimensional (2D) image data of a physical object (e.g., a pizza slice) that is located at a first remote location (e.g., a restaurant), and then coordinates processing into three dimensions. Specifically, a local scanning rig in conjunction with an image capture device (e.g., mobile phone), creates an image file comprising the 2D image, depth information, and an identifier. The digitalization engine receives the 2D image file, stores it, and forwards the 2D image file to an image processing resource also remote from the digitalization engine. The digitalization engine then receives from the image processing resource, a three dimensional model file (e.g., created by photogrammetry) of the 2D images. The digitalization engine communicates the 3D model file for consumption (e.g., incorporation of the 3D pizza slice into a virtual menu). By distributing image processing resources across multiple image consumers, embodiments avoid any one consumer having to shoulder an entire burden and cost of digitalization.

The following detailed description and accompanying drawings provide a better understanding of the nature and advantages of various embodiments.

DETAILED DESCRIPTION

Described herein are methods and apparatuses that implement digitalization of physical objects. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
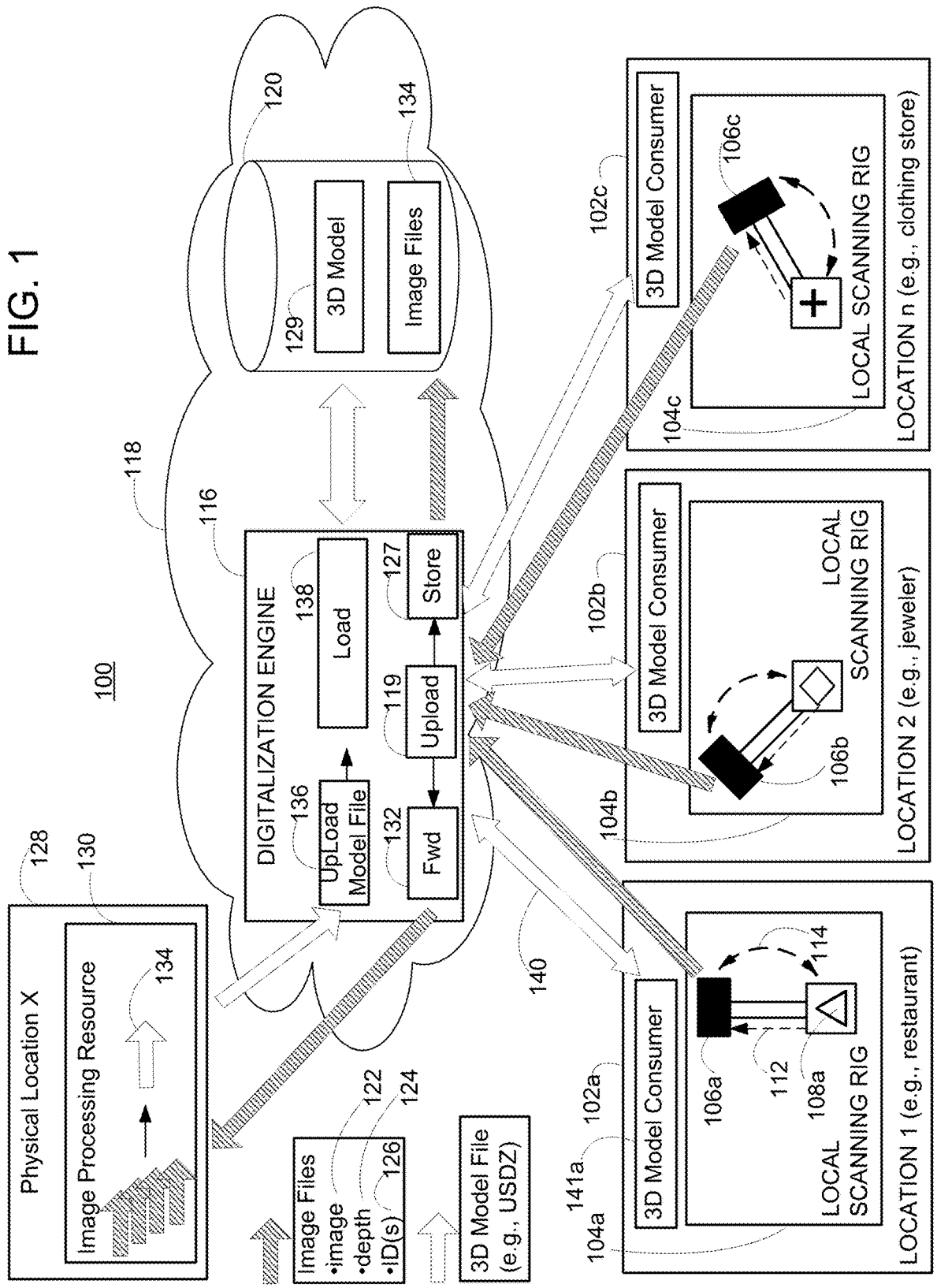
FIG. 1 shows a simplified diagram of a system according to an embodiment.

FIG. 1 shows a simplified view of an example system that is configured to implement digitalization according to an embodiment. Specifically, system 100 comprises a plurality of distinct physical locations 102*a*, 102*b*, 102*c*, each including a separate local scanning rig 104*a*, 104*b*, and 104*c*. The local scanning rigs are in communication with respective image capture devices 106*a*, 106*b*, and 106*c*.

In one possible example described below, the first physical location comprises a restaurant, which is seeking to create a 3D asset such as a digitalized slice of pizza 108*a*. Accordingly, the image capture device 106*a* instructs the local rig to assist in capturing raw image data 122 of the pizza slice taken from a variety of depths 112 and perspectives 114.

The restaurant seeks to consume the digitalized pizza slice (e.g., by incorporation into a virtual menu showing the pizza slice and other food items in 3D). However, the restaurant lacks the image handling expertise and technical resources (e.g., hardware; software) to convert the captured 2D image data into a 3D model.

Accordingly, each image capture device in the various different physical locations, is in communication with a digitalization engine 116. The digitalization engine is located on the cloud 118, remote from the physical locations.

The image capture devices are configured to upload the 2D image files to the digitalization engine. The digitalization engine is in communication with a non-transitory computer readable storage medium 120.

The digitalization engine receives the 2D image files including the raw image 122 as well as other data such as the depth 124 and identifier(s) 126 (e.g., of the particular capture device and/or the particular 3D modeling projects). The digitalization engine is configured to store 127 the uploaded 2D image files in the non-transitory computer readable storage medium, and possibly to augment those files (e.g., with the addition of identifiers).

The digitalization engine is further in communication with a separate physical location 128 (e.g., a dedicated office) which includes an image processing resource 130. That physical location is remote from the cloud and may also be remote from one or more of the distinct physical locations (e.g., restaurant) described above.

The digitalization engine is configured to forward 132 the captured 2D image files to the image processing resource. That image processing resource processes the captured 2D image files in an iterative manner to create a 3D model file 134 in a specific format.

Then, the image processing resource uploads 136 the 3D model to the digitalization engine. The digitalization engine loads 138 the 3D model 129 to the storage medium.

The 3D model can be accessed 140 from the discrete physical location (e.g., for preview; display; manipulation; attribute configuration; other purposes). The 3D model 129 is communicated from the digitalization engine to a 3D model consumer 141*a* positioned at the discrete physical location, for consumption (e.g., incorporation into a digital menu). The 3D model consumer can also interact with the engine to load image assets.

In a manner similar to that described above, other discrete locations (e.g., jewelry store; clothing store) can access their local scanning rig in combination with the digitalization engine, in order to efficiently convert multiple captured 2D images of different items for consumption—e.g., in a virtual (jewelry; clothing) catalogs. Such digitalization may be accomplished without each location having to invest in the (expertise/hardware/software) resources necessary to perform digitalization. The digitalization engine may augment received 2D image files (e.g., by the addition of identifiers) to aid in the recognition and handling of specific data models that are relevant to images of particular physical objects captured at specific locations.

While the embodiment of FIG. 1 shows the digitalization engine as primarily handling communication of the 2D image and 3D model files, the digitalization engine can perform additional functions. Examples of such functions can include but are not limited to:
  conversion between 2D image formats;
  creation of identifiers;
  image pre-processing;
  conversion between 3D model formats;
  configuring the remote capture device, the scanning rig, and/or the image processing resource to operate in a particular manner (e.g., utilizing specific formats; scanning in a particular sequence; others).

Figure 2:
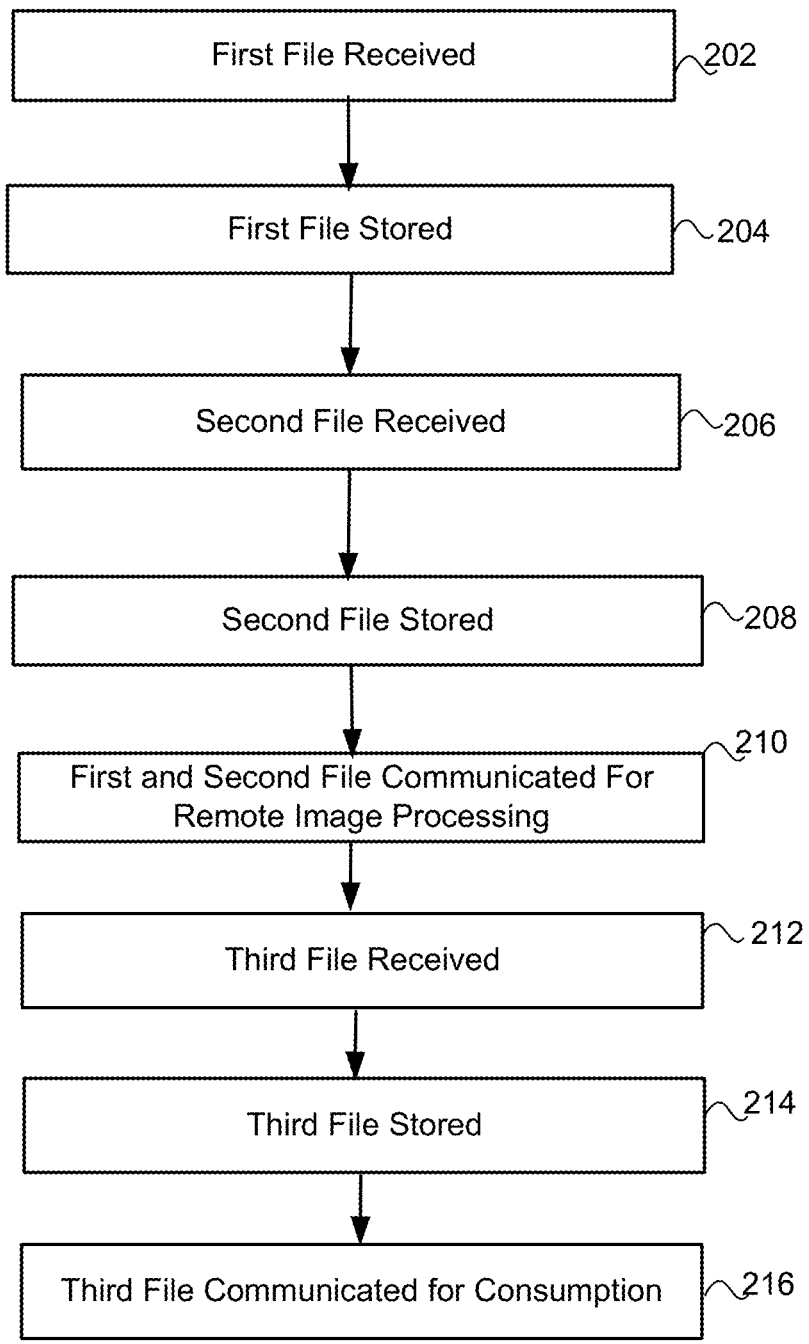
FIG. 2 shows a simplified flow diagram of a method according to an embodiment.

FIG. 2 is a flow diagram of a method 200 according to an embodiment. At 202, a first file comprising a 2D image, a depth, and an identifier is received from a remote location. At 204, the first file is stored.

At 206, a second file comprising another 2D image is received from the remote location. At 208 the second file is stored.

At 210, the first file and the second file are forwarded to another remote location to create a 3D model. At 212 a third file comprising the 3D model is received from the other remote location.

At 214 the third file is stored. At 216 the third file is communicated for consumption.

Further details regarding digitalization according to various embodiments, are now provided in connection with the following example. In this particular example, digitalization is implemented with an image processing resource in the form of a Mac Mini computer having an M1 processor.

Example

Figure 3:
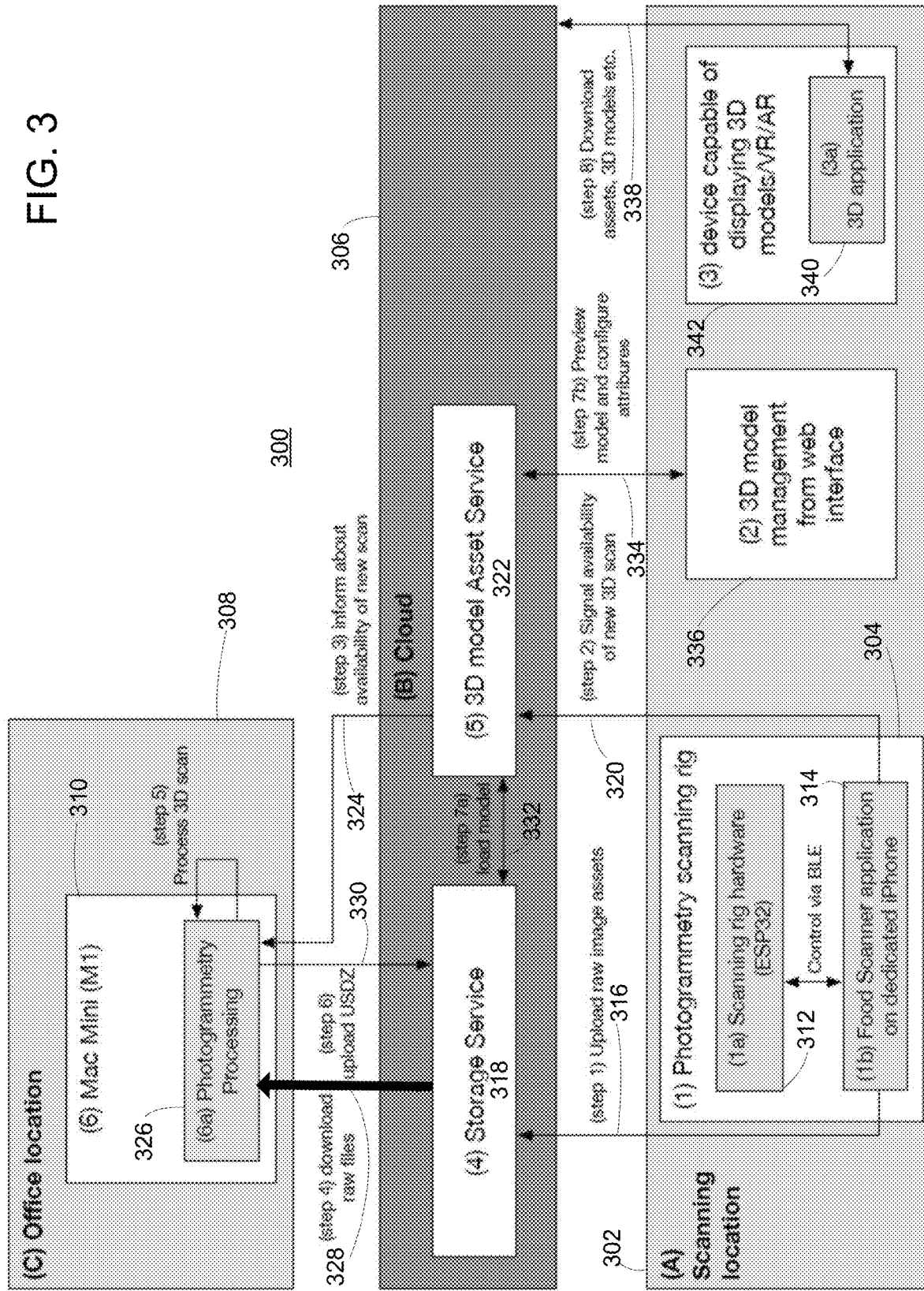
FIG. 3 shows an overview of a workflow of implementing digitalization according to the example.

A block diagram of an example system for performing digitalization, is shown in FIG. 3. The system 300 includes a first location 302 where the physical objects are present and scanned by a photogrammetry scanning rig 304.

The system of FIG. 3 also comprises a cloud storage 306. This is where the image assets are saved and managed.

FIG. 3 also shows a third location 308. This may be an office where processing of the image assets takes place on specialized hardware 310 (e.g., a Mac Mini having an M1 processor).

A process flow for digitalization according to this example is also illustrated in FIG. 3. At 1a, hardware 312 (e.g., a scanning arm and ESP32 microcontroller) of the scanning rig operates to allow capture of the images controlled 1b by a dedicated application 314 on a mobile device (e.g., an iPhone). Control over the scanning rig by the mobile device may be achieved via a Bluetooth Low Energy (BLE) interface.

At 316, the raw image assets captured by the mobile device, are uploaded to the storage service 318 on the cloud. These raw image assets comprise pictures and depth information available from the scanning rig.

At 320, the mobile application also signals the availability of the new image assets to a 3D model asset service 322. That asset service in turn informs 324 the dedicated computing resource (e.g. Mac Mini with M1 processor) regarding the availability of new image assets.

According to certain embodiments, this informing could take place directly. Alternatively, this information could be used within an indirect communication channel. For example, the dedicated computing resource could periodically check for the availability of new information/data through a polling mechanism.

A photogrammetry processing application 326 that is present in the computing resource, then downloads 328 the raw image assets from the cloud storage. The photogrammetry processing application processes the downloaded image assets locally through specialized operations.

These specialized operations may be provided by the operating system/Software Development Kits (SDKs) available on the dedicated computing resource. The result of the processing is a 3D model of the Universal Scene Description Zipped (USDZ) file format.

The USDZ 3D model is then uploaded 330 to the asset storage (in step 6). In step 7a the USDZ 3D model is fetched and loaded 332.

In step 7b, users at the scanning location can manage 334 (check and make modifications to) the 3D model from a designated 3D model management web interface 336. That model management interface can provide a further software interface to automatic post-processing (e.g., cropping; color-optimization).

Once the processed asset is released, in step 8 it can be downloaded 338 by the consuming application 340 of the device 342 that can display 3D models as part of a VR or AR functionality.

The processed image asset that is downloaded can be consumed at the scanning location (or other locations), in 3D modeling and processing setups. One example is 3D printing.

Digitalization embodiments as disclosed herein may offer one or more benefits. Specifically, one possible benefit is reduction in cost of digitalization. In particular, embodiments allow for a decentralized capturing, processing, and management of the newly created 3D assets. There is no need for each physical location seeking to consume a digitalized item, to possess the powerful processing apparatus to create the 3D model.

This permits specialized hardware (e.g. an Apple computer equipped with an M1 processor) to process the raw images into a 3D asset. The end-to-end workflow offered by embodiments starts with capturing images of the objects, and ends with a finished and ready-to-use 3D model.

It is noted that embodiments do not require any particular 2D format. Examples of possible 2D formats can include but are not limited to the following.
  JPEG (Joint Photographic expert group)
  PNG (Portable Network Graphics)
  BMP (Bitmap)
  HEIF (High Efficiency Image File Format)
  TIFF (Tag Image File Format)
  GIF (Graphics Interchange Format)
  AVIF (AV1 Image File Format)
  RAW (Raw Image Data)
  WebP It is noted that embodiments do not require any particular 3D model format. Examples of possible 3D formats can include but are not limited to the following.

USDZ (Universal Scene Descriptor, zipped), USD (Universal Scene Descriptor)

FBX

STL (Standard Triangle Language)

OBJ

GLTF (Graphics Language Transmission Format), GLB (Graphics Language Transmission Format, binary)

PLY (Polygon File Format)

STEP (Standard for the exchange of product data)

Returning now to FIG. 1, there the particular embodiment is depicted with the digitalization engine as being located outside of the database. However, this is not required.

Rather, alternative embodiments could leverage the processing power of an in-memory database engine (e.g., the in-memory database engine of the HANA in-memory database available from SAP SE), in order to perform one or more various functions as described above—e.g., format conversion, image (pre-)processing.

Figure 4:
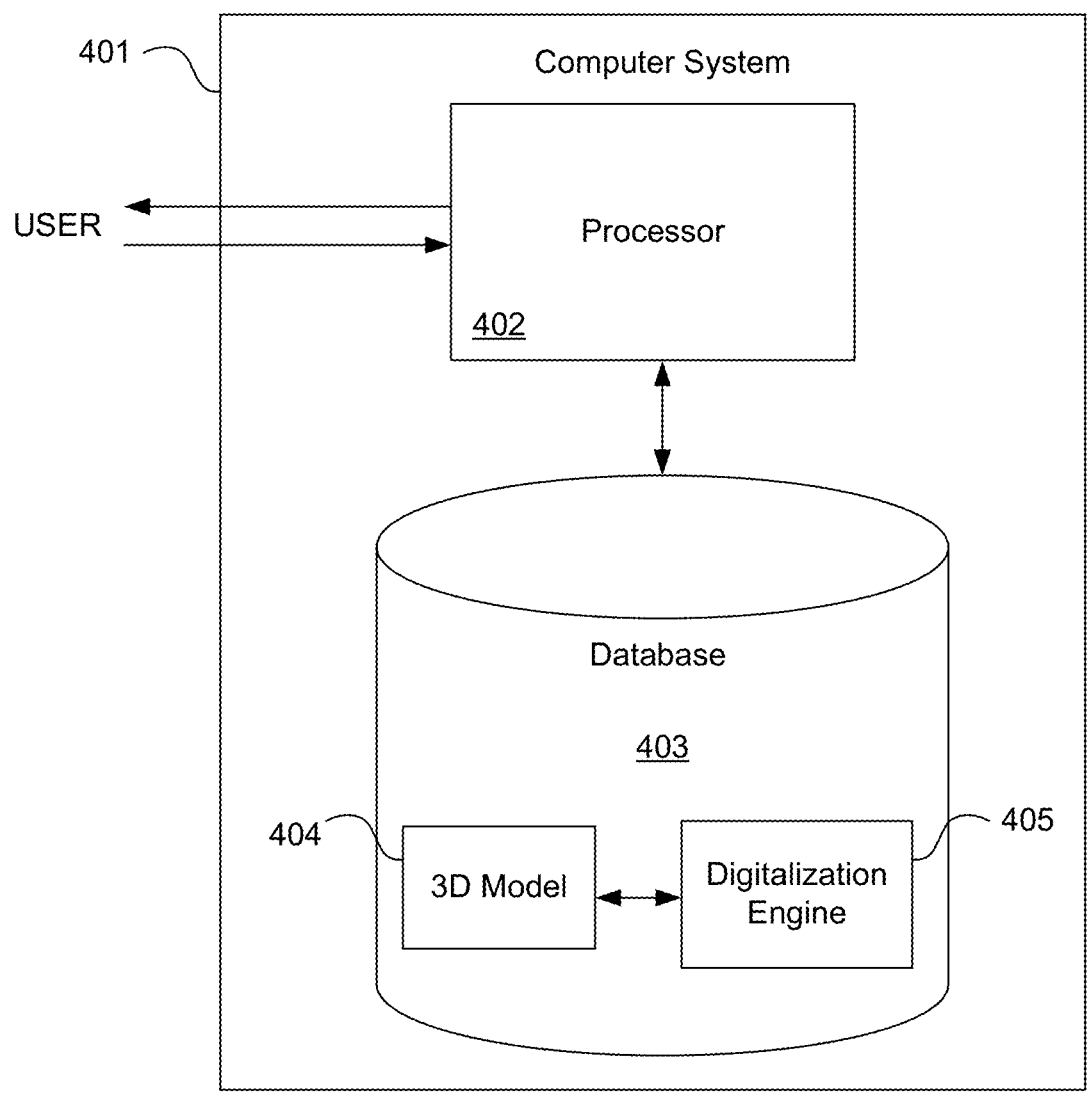
FIG. 4 illustrates hardware of a special purpose computing machine configured to implement digitalization according to an embodiment.

Thus FIG. 4 illustrates hardware of a special purpose computing machine configured to perform digitalization according to an embodiment. In particular, computer system 401 comprises a processor 402 that is in electronic communication with a non-transitory computer-readable storage medium comprising a database 403. This computer-readable storage medium has stored thereon code 405 corresponding to a digitalization engine. Code 404 corresponds to image data. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented system and methods comprising:
  receiving from a first remote location, a first file comprising a first two dimensional mage of a physical object, a first depth, and an identifier;
  storing the first file in a non-transitory computer readable storage medium;
  receiving from the first remote location, a second file comprising a second two dimensional image of the physical object;
  storing the second file in the non-transitory computer readable storage medium;
  communicating the first file and the second file to a second remote location;
  receiving from the second remote location, a third file comprising a three dimensional model of the physical object;
  storing the third file in the non-transitory computer readable storage medium; and
  communicating the third file for consumption.

Example 2. The computer implemented system and method of Example 1 wherein the third file is created by photogrammetry at the second remote location.

Example 3. The computer implemented system and method of Example 2 wherein the third file has a Universal Scene Description Zipped (USDZ) file format.

Example 4. The computer implemented system and method of Examples 1, 2, or 3 wherein the third file is communicated to the first remote location for consumption.

Example 5. The computer implemented system and method of Example 1, 2, 3, or 4 further comprising augmenting the first file and the second file with an additional identifier.

Example 6. The computer implemented system and method of Example 1, 2, 3, 4, or 5 wherein the first two-dimensional image is in a first format, the method further comprising:
  converting the first two-dimensional image from the first format to a second format.

Example 7. The computer implemented system and method of Examples 1, 2, 3, 4, 5, or 6 wherein the first two dimensional image and the second two dimensional image are captured by a mobile computing device.

Example 8. The computer implemented system and method of Examples 1, 2, 3, 4, 5, 6, or 7 further comprising prior to receiving the first file, configuring: at least one of an image capture device at the first remote location, and the image processing resource at the second remote location.

Example 9. The computer implemented system and method of Examples 1, 2, 3, 4, 5, 6, 7, or 8 wherein:
  the non-transitory computer readable storage medium comprises an in-memory database; and
  an in-memory database engine of the in-memory database stores the first file, the second file, and the third file.

Figure 5:
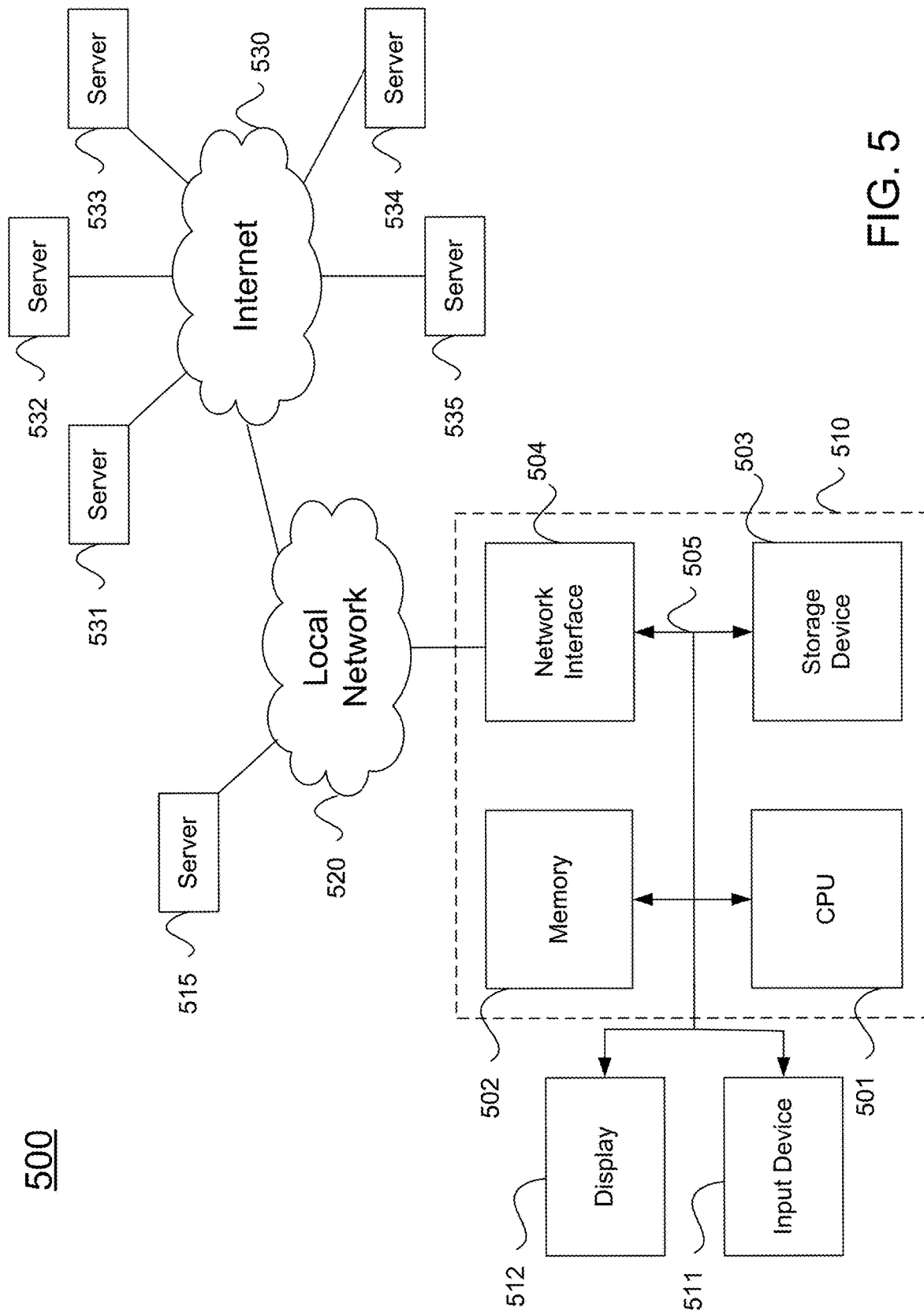
FIG. 5 illustrates an example computer system.

An example computer system 500 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a Light Emitting Diode (LED) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
    receiving, in a cloud computer system, from a first remote location, a first file comprising a first two dimensional image of a physical object, a first depth, and an identifier specifying a 3D modeling project;
    storing the first file in a non-transitory computer readable storage medium in the cloud computer system;
    receiving, in the cloud computer system, from the first remote location, a second file comprising a second two dimensional image of the physical object, a second depth, and the identifier specifying the 3D modeling project;
    storing the second file in the non-transitory computer readable storage medium in the cloud computer system;
    communicating, by the cloud computer system, the first file, the first depth, the second file, and the second depth to a second remote location based on the identifier, wherein the second remote location is a non-cloud computer system comprising a local computer configured with a photogrammetry processing application;
    generating, in the non-cloud computer system, a third file comprising a three dimensional model of the physical object based on the first file, the first depth, the second file, and the second depth;
    receiving, in the cloud computer system, from the second remote location, the third file comprising a three dimensional model of the physical object;
    storing the third file in the non-transitory computer readable storage medium in the cloud computer system; and
    communicating, by the cloud computer system, the third file to the first remote location for consumption.

2. A method as in claim 1 wherein the third file is communicated to the first remote location for consumption.

3. A method as in claim 1 wherein the third file has a Universal Scene Description Zipped (USDZ) file format.

4. A method as in claim 1 further comprising augmenting the first file and the second file with an additional identifier.

5. A method as in claim 1 wherein the first two-dimensional image is in a first format, the method further comprising:
    converting the first two-dimensional image from the first format to a second format.

6. A method as in claim 1 wherein the third file is in a first format, the method further comprising:
    converting the third file from the first format to a second format.

7. A method as in claim 1 wherein the first two dimensional image and the second two dimensional image are captured by a mobile computing device.

8. A method as in claim 1 further comprising:
    prior to receiving the first file, configuring at least one of an image capture device at the first remote location, and the image processing resource at the second remote location.

9. A method as in claim 1 wherein:
    the non-transitory computer readable storage medium comprises an in-memory database; and
    an in-memory database engine of the in-memory database stores the first file, the second file, and the third file.

10. A method as in claim 1 wherein the first and second two dimensional images are of a same product, and wherein the three dimensional image is of the same product sold by a retail business.

11. A non-transitory computer readable storage medium embodying a computer program for performing a method, said method comprising:
    receiving, in a cloud computer system, from a first remote location, a first file comprising a first two dimensional image of a physical object, a first depth, and an identifier specifying a 3D modeling project;
    storing the first file in a non-transitory computer readable storage medium in the cloud computer system;
    receiving, in the cloud computer system, from the first remote location, a second file comprising a second two dimensional image of the physical object, a second depth, and the identifier specifying the 3D modeling project;
    storing the second file in the non-transitory computer readable storage medium in the cloud computer system;
    communicating, by the cloud computer system, the first file, the first depth, the second file, and the second depth to a second remote location based on the identifier, wherein the second remote location is a non-cloud computer system comprising a local computer configured with a photogrammetry processing application;
    generating, in the non-cloud computer system, a third file comprising a three dimensional model of the physical object based on the first file, the first depth, the second file, and the second depth;
    receiving, in the cloud computer system, from the second remote location, the third file comprising a three dimensional model of the physical object;
    storing the third file in the non-transitory computer readable storage medium in the cloud computer system; and
    communicating, by the cloud computer system, the third file to the first remote location for consumption.

12. A non-transitory computer readable storage medium as in claim 11 wherein the third file has a Universal Scene Description Zipped (USDZ) file format.

13. A non-transitory computer readable storage medium as in claim 11 wherein the first two-dimensional image is in a first format, the method further comprising:
converting the first two-dimensional image from the first format to a second format.

14. A non-transitory computer readable storage medium as in claim 11 wherein the third file is in a first format, the method further comprising:
converting the first format to a second format.

15. A computer system comprising:
one or more processors;
a software program, executable on said computer system, the software program configured to cause an in-memory database engine of an in-memory database to:
receive, in a cloud computer system, from a first remote location, a first file comprising a first two dimensional image of a physical object, a first depth, and an identifier specifying a 3D modeling project;
store the first file in a non-transitory computer readable storage medium in the cloud computer system;
receive, in the cloud computer system, from the first remote location, a second file comprising a second two dimensional image of the physical object, a second depth, and the identifier specifying the 3D modeling project;
store the second file in the non-transitory computer readable storage medium in the cloud computer system;
communicate, by the cloud computer system, the first file, the first depth, the second file, and the second depth to a second remote location based on the identifier, wherein the second remote location is a non-cloud computer system comprising a local computer configured with a photogrammetry processing application;
generate, in the non-cloud computer system, a third file comprising a three dimensional model of the physical object based on the first file, the first depth, the second file, and the second depth;
receive, in the cloud computer system, from the second remote location, the third file comprising a three dimensional model of the physical object;
store the third file in the non-transitory computer readable storage medium in the cloud computer system; and
communicate, by the cloud computer system, the third file to the first remote location for consumption.

16. A computer system as in claim 15 wherein the in-memory database engine is further configured to communicate the third file to the first remote location for consumption.

17. A computer system as in claim 15 wherein the third file is in a Universal Scene Description Zipped (USDZ) format.

18. A computer system as in claim 15 wherein the first two-dimensional image is in a first format, the in-memory database engine further configured to:
convert the first two-dimensional image from the first format to a second format.

19. A computer system as in claim 15 wherein the third file is in a first format, the in-memory database engine further configured to:
convert the first format to a second format.

\* \* \* \* \*